Figure 1:
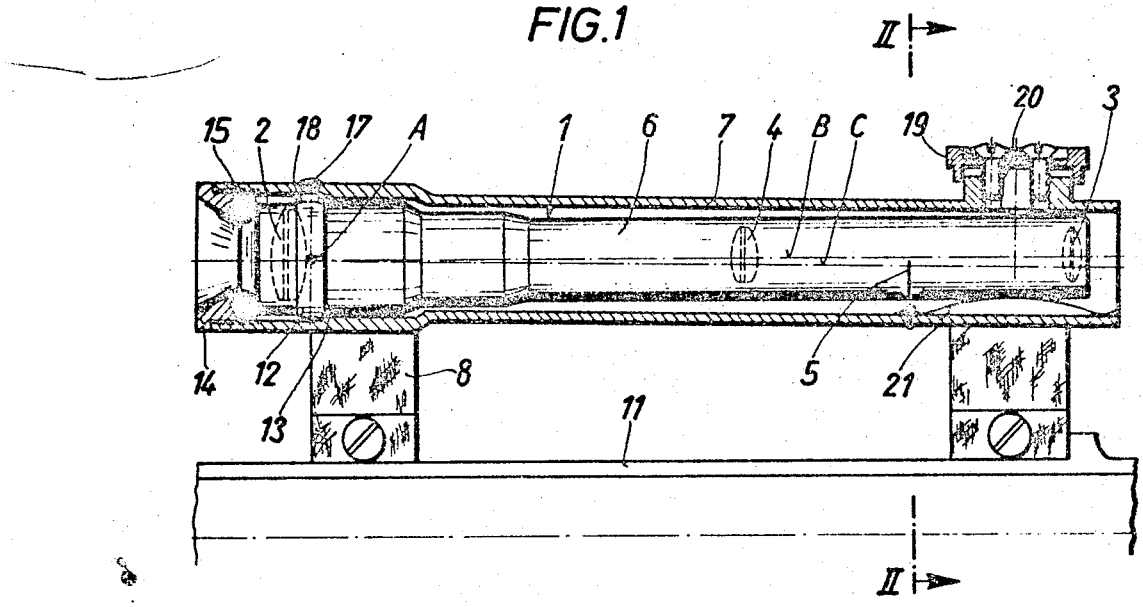

Seifried

[15] 3,642,341
[45] Feb. 15, 1972

[54] OPTICAL AIMING DEVICE FOR RIFLES

[72] Inventor: Paul Seifried, Badenweiler, Germany
[73] Assignee: Rheinmetall GmbH, Dusseldorf, Germany
[22] Filed: Apr. 30, 1970
[21] Appl. No.: 33,427

[30] Foreign Application Priority Data

May 14, 1969 Germany...................P 19 24 606.1

[52] U.S. Cl.................................350/10, 33/50 B, 356/247
[51] Int. Cl.......................................................F41g 1/38
[58] Field of Search.........................350/10; 356/247; 33/50

[56] References Cited

UNITED STATES PATENTS 3,484,148  12/1969  Gotoh...................350/10 X

*Primary Examiner*—David Schonberg
*Assistant Examiner*—Robert L. Sherman
*Attorney*—Ernest G. Montague

[57] ABSTRACT

An optical aiming device for rifles, which comprises a telescopic sight equipped with an aiming member, and a tubular carrying-grip. The telescopic sight is mounted swingably to all sides, as well as screwable inside of the substantially cylindrical carrying-grip provided on the rifles.

6 Claims, 2 Drawing Figures

INVENTOR
Paul Seifried
BY Ernest Montagne
Attorney

OPTICAL AIMING DEVICE FOR RIFLES

The present invention relates to an optical aiming device for rifles.

In connection with rifles, more recently, in the first instance, the diopter is the conventional sighting device used by the army, since it permits a more exact aiming as the previously used sighting device consisting of a backsight and a frontsight. In twilight, however, an exact firing by aiming is not possible, due to the light reduction through the diopter opening. Furthermore, a recognition of the direct aiming periphery is rendered more difficult.

These drawbacks are avoided by optical aiming devices. The latter consist mostly of telescopic sights, which are additionally mounted on the rifle. Since mostly one deals thereby with sensitive optical and thus also more expensive instruments, which require, due to their sensitivity against blows, a careful treatment, in particular of the setting device of the aiming member disposed in the optic, these aiming devices are not suitable for the general army use, rather only in exceptional cases, for instance, for sharp shooters.

It is one object of the present invention, to provide an optical aiming device for rifles, for the general army use, which, at first, is simple in its structure, and therefore, comparatively economical in its manufacture and furthermore, can be secured to the rifle in a simple manner, protected against blows and shocks.

It is another object of the present invention, to provide an optical aiming device for rifles, which comprises a telescopic sight equipped with an immovable aiming member, which telescopic sight is mounted as an independent part swingably to all sides, as well as securable inside of a tubular carrying-grip, which is substantially cylindrical, and provided on the weapon.

Aiming devices in connection with the carrying-grip provided on the rifle are known. In this arrangement, the carrying-grip has at its upper side a longitudinal trough for receiving a backsight or a diopter, or it has a telescopic sight secured additionally on the upper side of the hand grip and is thereby exposed to the danger of damages.

It is still another object of the present invention, to provide an optical aiming device for rifles, which includes an advantageous, yet simple and simultaneously safe mounting of the aiming device, so that the telescopic sight is mounted at one end by means of a crowned centering ring in the carrying-grip and is settable as to its height and towards the side at its other end by means of known setting means provided on the tubular carrying-grip.

In accordance with a further development of the present invention, the telescopic sight is retained in the carrying-grip by engagement of the crowned centering ring against a conical shoulder, and by a setting ring screwable axially into the carrying tube and effecting by means of an elastic intermediate ring on the end side of the telescopic sight. In this manner, a holding in axial direction, which holding on the one hand is reliable and on the other hand elastic, is obtained, so that the recoil forces of the weapon cannot render a damaging effect.

The simple mounting of the aiming device is made possible in an advantageous development of the present invention additionally such, that the height- and side-setting device comprises a setscrew, each disposed in the wall of the carrying-grip and effecting the housing of the telescopic sight, and that springs, in particular blade springs, are coordinated to the setscrews and are disposed substantially diametrically opposite the set screws and which support themselves between the inner wall of the tube and the housing of the telescopic sight.

As an aiming device, a simple nonadjustable and light optical system with a rigid aiming member, and which optical system is only slightly enlarging. In this manner, the rifleman has a comparatively large viewing field and can well observe the target as well as its direct surroundings.

Figure 2:
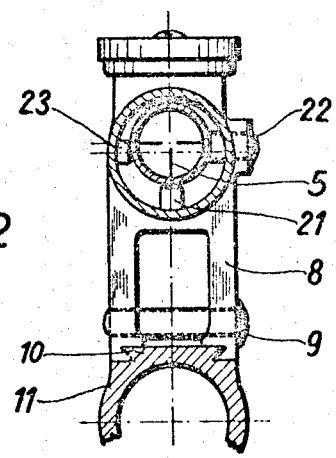

With these and other objects in view, which will become apparent in the following detailed description, the present invention, which is disclosed by example only, will be clearly understood in connection with the accompanying drawings, in which:

FIG. 1 is an axial section of an aiming device disposed within the carrying-grip of a rifle and designed in accordance with the present invention; and FIG. 2 is a cross section along the lines II—II.

Referring now to the drawing, the telescopic sight 1 forming an optical aiming device is disclosed, and the aiming device comprises an immovable optical system, and which optical system is not at all or only weakly enlarging, the optical system having an ocular lens 2, an objective lens 3, a reversing lens 4 disposed therebetween, as well as a rigidly arranged aiming member 5 between the lenses 3 and 4. All parts are rigidly and nonadjustably arranged in the housing of the telescopic sight.

The telescopic sight 1 forming an independent part is disposed in a tubular carrying-grip 7, open at both ends, which carrying-grip 7 is secured by means of two supports 8, as well as by clamping screws 9, on a weapon housing 11, equipped with a dovetail guide 10. It is thus possible, to remove the carrying-grip 7 with the telescopic sight 1 from the rifle and to mount instead a conventional telescopic sight for sharp shooters.

The telescopic sight 1 has at its rear end a centering ring 12, formed crowned outwardly which comes into engagement during axial insertion into the tubular carrying-grip with a conical shoulder 13, provided inside of the carrying-grip. By a setting ring 14, axially screwed into the rearward end of the carrying-grip and by a rubber elastic intermediate ring 15, the telescopic sight is retained in axial direction. In view of the rubber elastic ring 15, however, an all-sided swinging of the telescopic sight about the point A is assured. For securing of the vertical position of the aiming member 5, a guide pin 17 is inserted radially into the wall of the carrying-grip, which enters a groove 18, disposed in the centering ring 12 in correspondence with the position of the aim member 5.

Within the range of the viewing end of the telescopic sight, setting- and adjusting-screws are provided on the carrying-grip and effective upon the wall of the telescopic sight. The height-adjusting device comprises a setscrew 19 equipped at its periphery with a line marker for different aiming distances, which setscrew 19 is effective by means of a pin 20 on the wall of the telescopic sight, the latter being pressed against the pin 20 by a diametrically oppositely disposed blade spring 21, which is secured to the carrying-grip. For a side adjustment, an adjustment screw 22 is provided in the carrying-grip, as well as an oppositely disposed blade spring 23.

In order to maintain the diameter of the carrying-grip at a small scale and to obtain nevertheless a possibly largest height adjustment range of the telescopic sight, for example, up to 1,000 m., the carrying-grip is slightly inclined relative to the axis of the bore in aiming direction (angle BAC).

While I have disclosed several embodiments of the present invention, it is to be understood that these embodiments are given by example only and not in a limiting sense.

I claim:

1. An optical aiming device for rifles, comprising a telescopic sight equipped with an aiming member,
    an open-ended tubular carrying-grip provided on said rifles, and
    said telescopic sight being a completely independent structural member and mounted swingably to all sides, as well as operatively mounted screwable inside of said carrying-grip.

2. The optical aiming device for rifles, as set forth in claim 1, wherein
    said telescopic sight having adjacent at one end an outwardly crowned centering ring,
    said carrying-grip having a shoulder cooperatively mountingly engaging said crowned centering ring and setting means provided at the other end of said
    telescopic sight and on said tubular carrying-grip, said setting means for adjustably setting said telescopic sight as to its height and towards the side, said telescopic sight having its pivot adjacent said shoulder.

3. The optical aiming device for rifles, as set forth in claim 2, wherein
   said shoulder is conical,
   a setting ring axially screwable into an end of said carrying-grip corresponding to said one end of said telescopic sight,
   an elastic intermediate member disposed abuttingly between said one end of said telescopic sight and said setting ring, and
   said telescopic sight is retained in said carrying-grip by engagement of said crowned centering ring against said conical shoulder by the operative pressing of said setting ring screwed into said carrying-grip and effecting said one end of said telescopic sight by means of said elastic intermediate ring.

4. The optical aiming device for rifles, as set forth in claim 3, which includes
   as guiding groove provided in said housing of said telescopic sight, for the securing of the vertical position of said aiming member, and
   a guide pin disposed through the wall of said carrying-grip and interengaging said guiding groove, 5. The optical aiming device for rifles, as set forth in claim 1, which includes
   a height- and side-setting device which comprises each a setscrew disposed in the wall of said carrying-grip and operatively effects the housing of said telescopic sight, and
   spring means operatively coordinated to said setscrews and disposed substantially diametrically opposite of said setscrews on the other side of said housing, and supporting themselves between the inner wall of said carrying-grip and said housing of said telescopic sight.

6. The optical aiming device for rifles, as set forth in claim 5, wherein
   said carrying-grip is releasably secured to said rifles.

* * * * *